United States Patent Office 2,760,565
Patented Aug. 28, 1956

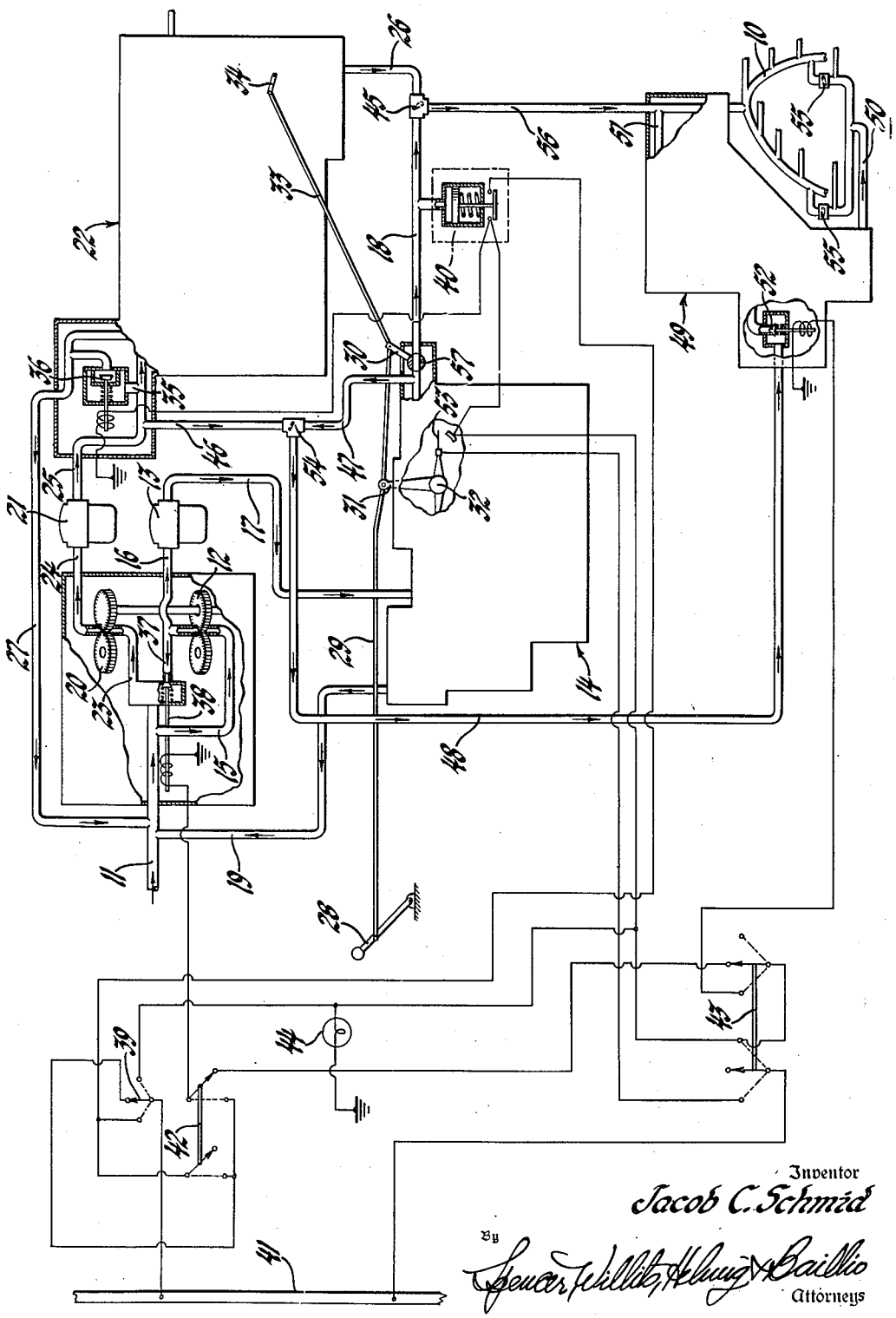

2,760,565

DUAL FUEL SYSTEM

Jacob C. Schmid, Indianapolis, Ind., assignor to General Motors Corporation, Detroit, Mich., a corporation of Delaware Application February 1, 1949, Serial No. 73,983

12 Claims. (Cl. 158—36.4)

This invention has to do with fuel systems, particularly fuel systems for combustion gas turbines which are used to propel airplanes.

The principal object of the invention is to provide a fuel system in which failure of a unit of the system will not result in interruption of the supply of fuel to the user and consequent failure of the user with the serious consequences the failure may entail, e. g., in the event the user is an airplane propelling combustion gas turbine. To attain this object, there is provided in the fuel system an auxiliary fuel line through which fuel may be supplied to the user in the event of failure of the pump or any other unit of the main fuel line through which fuel is advanced to the user under normal conditions and means by which the advance of fuel through the main fuel line may be discontinued and the advance of fuel through the auxiliary fuel line initiated automatically upon failure of a unit of the main fuel line or at the will of the operator.

For a better understanding of the objects and nature of this invention, reference is made to the following specification and the accompanying drawing wherein the preferred embodiment of the invention is described and illustrated.

In the accompanying drawing, the single figure shows more or less diagrammatically a fuel system for an airplane propelling combustion gas turbine in which the invention is embodied.

In the drawing, the reference character 10 indicates the manifold through which fuel is supplied to the several burners of an airplane propelling combustion gas turbine and the reference character 11 a pipe in which fuel from a supply tank (which is not shown in the drawing) is maintained by a pump (which is not shown in the drawing). To supply fuel to the manifold 10 from the pipe 11 under normal conditions, there is provided a main fuel supply system. The main fuel supply system includes a turbine driven main fuel pump 12, a filter 13, a control 14 for regulating the rate at which fuel is supplied to the manifold, a pipe 15 through which fuel is conducted from the pipe 11 to the pump 12, a pipe 16 through which fuel is conducted from the pump 12 to the filter 13, a pipe 17 through which fuel is conducted from the filter 13 to the control 14 and pipes 18 and 56 through which fuel is conducted from the control 14 to the manifold 10. To return to the pipe 11, the fuel supplied by the pump 12 to the control 14 in excess of the volume it is desired to supply to the manifold 10, there is provided a pipe 19.

To supply fuel to the manifold 10 from the pipe 11 automatically upon failure of a unit of the main fuel supply system or at the will of the operator, there is provided an auxiliary fuel supply system. The auxiliary fuel supply system includes a turbine driven auxiliary fuel pump 20, a filter 21, a control 22 for regulating the rate at which fuel is supplied to the manifold, a pipe 23 through which fuel is conducted from the pipe 11 to the pump 20, a pipe 24 through which fuel is conducted from the pump 20 to the filter 21, a pipe 25 through which fuel is conducted from the filter 21 to the control 22 and a pipe 26 through which fuel is conducted from the control 22 to the pipe 56 and, thence, to the manifold 10. To return to the pipe 11 the fuel supplied by the pump 20 in excess of that it is desired to supply to the manifold 10, there is provided a pipe 27.

To adjust the rate at which fuel is supplied to the manifold 10, there is provided a control lever 28 connected by a rod 29 and arms 30 and 31 to a throttle valve 57 and a bell crank 32 in the main control 14 and by the rod 29, a rod 33 and an arm 34 to a throttle valve (which is not shown in the drawing) in the auxiliary control 22.

In the auxiliary fuel supply system, there is provided a by-pass 35 from the pipe 25 to the pipe 27 which under normal conditions is open and renders the auxiliary fuel supply system inoperative but in which there is provided a solenoid actuated valve 36 by which the by-pass may be closed and the auxiliary fuel supply system rendered operative automatically upon failure of a unit of the main fuel supply system or at the will of the operator. In the main fuel supply system, there is provided a by-pass 37 from the pipe 16 to the pipe 11 in which, however, there is provided a solenoid actuated valve 38 which under normal conditions is closed and renders the main fuel supply system operative but may be opened to unload the main pump and thus render the main fuel supply system entirely inoperative when the valve 36 in the by-pass 35 in the auxiliary fuel supply system is closed to render the auxiliary fuel supply system operative.

The solenoids which actuate the valves 36 and 38 are unenergized under normal conditions but, as indicated in the drawing, are connected to ground and may by operation of a switch 39 or a switch 40 be connected to a bus bar 41 which represents the other side of a source of electric energy and thus energized to close the valve 36 and render the auxiliary fuel supply system operative and open the valve 38 and render the main fuel supply system inoperative.

When the turbine is operating normally, as, for example, in normal flight when automatic cut-in of the emergency system is not desired, the switch 39 and the gang switches 42 and 43 are in the positions in which they are shown in solid lines in the drawing. The switch 40 is a pressure actuated switch installed in the pipe 18 between the control 14 and the junction of the pipe 18 with the pipes 26 and 56 so that it remains open as long as the pressure in the pipe 18 remains above a pre-selected value but closes when the pressure therein falls below the pre-selected value and thus constitutes means for automatically rendering the auxiliary fuel supply system operative and the main fuel supply system inoperative upon failure of a unit of the main fuel supply system. The switch 39 connects the solenoids which actuate the valves 36 and 38 to the bus bar 41 when it is in the right-most position in which it is shown in dash-and-dot lines in the drawing and thus constitutes means by which the operator may at will render the auxiliary fuel supply system operative and the main fuel supply system inoperative. The reference character 44 indicates a light which is lighted when the auxiliary fuel supply system is rendered operative and thus serves to advise the operator of the condition.

For automatic cut-in of the emergency fuel supply system upon failure of the main fuel supply system, switch 39 is shifted to its leftmost position. This position may be employed, for example, during take-off and landing of an aircraft when it is desired to cut in the emergency system without attention from the pilot which might involve dangerous delay. With switch 39 in the left most position and switches 42 and 43 in the solid line positions, a circuit is completed from the power supply bus 41 through switch 39 to the right hand contact of pressure switch 40. This switch is normally open, but, upon failure of pressure in the main fuel system, switch 40 closes, directly energizing valve 36 through one line to close the by-pass in the emergency fuel system and thus activate that system. Through a second line running from pressure switch 40 through switch 43 and switch 42, valve 38 is opened to by-pass completely the main fuel system.

Thus, with switch 39 in the center position, the emergency fuel system is not energized; with this switch in its right hand position, the emergency fuel system is energized by the pilot, and with the switch in its left hand position, the emergency system is energized when and if the main fuel system pressure fails by operation of switch 40.

If, when the switches 39 and 43 are in the positions in which they are shown in solid lines, the switch 42 is moved to the position in which it is shown in dash-and-dot lines in the drawing, it will connect the solenoid which actuates the valve 38 and the right-most contact of the switch 40 to the bus bar 41. If the switch 42 is moved to this position when the turbine is operating normally, the pressure in the pipe 18 will fall and, if the switch 40 is operating properly, it will, consequently, connect the solenoid which actuates the valve 36 and the light 44 to the bus bar. By moving the switch 42 to the position in which it is shown in dash-and-dot lines in the drawing when the turbine is operating normally the operator can, consequently, ascertain whether the switch 40 is operating properly.

At the junction of the pipes 18, 26 and 56, there is provided a double check valve 45 which prevents fuel from the pipe 18 entering the pipe 26 when the main fuel supply system is in operation and fuel from the pipe 26 entering the pipe 18 when the auxiliary fuel supply system is in operation.

To supply fuel to start the turbine, there are provided pipes 46 and 47 which are connected, respectively, to the pipe 25 of the auxiliary fuel supply system and the main control 14 immediately upstream of the throttle valve 57 and to a pipe 48. The pipe 48 leads to a starting fuel control 49 and, thence, through the branch 50 to two of the burners of the turbine and through the branch 51 and the pipe 56 to the manifold 10. In the pipe 48 upstream of the branches 50 and 51, there is provided a solenoid actuated valve 52 which is closed under normal conditions.

The solenoid which actuates the valve 52 is unenergized under normal conditions, but, as indicated in the drawing, is connected to ground and may by operation of the switch 43 and a switch 53 be connected to the bus bar 41 and thus energized to open the valve 52. The switch 53 is actuated by the bell crank 32 and is open under normal conditions but is closed when the throttle valves in the main and auxiliary fuel supply systems are closed.

To start the turbine, the throttle valves in the main and auxiliary fuel supply systems and the switch 53 are closed and the switch 43 moved to the left-most position in which it is shown in dash-and-dot lines in the drawing. Under this condition, the valves 36 and 38 in the by-passes 35 and 37 in the auxiliary and main fuel supply systems are closed and the valve 52 in the pipe 48 is open and if the turbine is cranked fuel will be supplied to the starting fuel control 49 by both of the pumps 12 and 20 through the pipe 48 whence it will pass through the branch 50 to the two burners to which it is connected and subsequently through the branch 51 into the manifold 10 to build up pressure therein.

When the fuel supplied to the two burners to which the branch 50 of the pipe 48 is connected is ignited, the flame spreads to the other burners and ignites the fuel which subsequently is supplied to them through the branch 51 of the pipe 48. When the turbine approaches idle speed, the throttle valves in the main and auxiliary fuel supply systems and the switch 53 are opened and the switch 43 moved to the position in which it is shown in solid lines in the drawing with the result that the valve 52 is closed and the valve 36 opened and fuel is thereafter supplied to the burners through the main fuel supply system until one of the units of the main fuel supply system fails or the operator moves the switch 39 to the right-most position in which it is shown in dash-and-dot lines in the drawing.

If the switch 43 is moved to its rightmost position, the fixed contact of switch 53 is energized directly from the bus 41 instead of through the movable contact of switch 53, and thereby the valve 36 is closed so that both the main and emergency fuel systems are in operation. Since the energizing line to the solenoid of starting valve 52 is open with switch 43 in this position, the starting control is not employed, but the discharge of both fuel systems is made available. This setting of the switch 43 is not employed under operating conditions but may be employed for starting, in which case the starting fuel is regulated through manipulation of the hand throttle 28.

At the junction of the pipes 46, 47 and 48 there is provided a double check valve 54 which prevents fuel from the pipe 47 entering the pipe 46 when the main fuel supply system is in operation and fuel from the pipe 46 entering the pipe 47 when the auxiliary fuel supply system is in operation. In the branch 50 of the pipe 48 there are provided check valves 55 which prevent fuel from branch 50 entering the manifold 10.

I claim:

1. In a system for advancing fuel from a reservoir to a user, a line through which fuel may be conducted from the reservoir to the user when the user is in operation, a pump for advancing fuel through the line from the reservoir to the user, another line through which fuel may be conducted from the reservoir to the user when the user is in operation, a pump for advancing fuel through the second specified line from the reservoir to the user, means by which the second specified line may be rendered inoperative or operative and the first specified line operative or inoperative when the user is in operation, another line through which fuel may be conducted from each of the first specified and the second specified lines to the user when the user is being started, and means by which both of the first specified and the second specified lines may be rendered operative when the user is being started.

2. A fuel supply system for an engine or the like, comprising, in combination, a normally operative main fuel pump, a normally inoperative auxiliary fuel pump, a common discharge line for the pumps, means including backflow prevention means for connecting the pumps to the discharge line, a throttle valve between each pump and the discharge line, a common actuator for the throttle valves, first means to disable the main pump, second means to activate the auxiliary pump, means responsive to reduction in pressure below a predetermined value in the outlet of the main pump for actuating the first and second means, manual means for actuating the first means to check the operation of the responsive means, and additional means for actuating the second means to render both pumps simultaneously operative to provide increased pumping capacity.

3. A fuel supply system for an engine or the like, comprising, in combination, a normally operative main fuel pump, a normally inoperative auxiliary fuel pump, the pumps being connected in parallel, a first common discharge line for the pumps, means including backflow prevention means for connecting the pumps to the first discharge line, means for throttling flow through the discharge line, means to activate the auxiliary pump, a second common discharge line for the pumps connected in advance of the throttling means, means including backflow prevention means for connecting the pumps to the second discharge line, a normally-closed valve in the second discharge line, and means for opening the last-named valve and operating the activating means for the auxiliary pump when the first common discharge line is closed by the throttling means.

4. A fuel supply system for an engine or the like, comprising, in combination, a normally operative main fuel pump, a normally inoperative auxiliary fuel pump, a first common discharge line for the pumps, means including backflow prevention means for connecting the pumps to the first discharge line, means for throttling flow through the discharge line, means to activate the auxiliary pump, means responsive to reduction in pressure below a predetermined value in the outlet of the main pump for actuating the activating means, manual means for actuating the activating means to render both pumps simultaneously operative, the last-named means being coupled to the throttling means so as to be rendered operative by closing of the first discharge line, a second common discharge line for the pumps connected in advance of the throttling means, means including backflow prevention means for connecting the pumps to the second discharge line, a normally-closed valve in the second discharge line, and means for opening the last-named valve when the first discharge line is closed.

5. A fuel supply system for an engine or the like, comprising, in combination, a normally operative main fuel pump, a normally inoperative auxiliary fuel pump, a first common discharge line for the pumps, means including backflow prevention means for connecting the pumps to the first discharge line, a throttle valve between each pump and the discharge line, a common actuator for the throttle valves, first means to disable the main pump, second means to enable the auxiliary pump, means responsive to reduction in pressure below a predetermined value in the outlet of the main pump for actuating the second means, manual means for actuating the first means to check the operation of the responsive means, and additional means for actuating the second means to render both pumps simultaneously operative, the last-named means being coupled to the throttle actuator so as to be rendered operative by closing the throttle valves, a second common discharge line for the pumps connected in advance of the throttles, means including backflow prevention means for connecting the pumps to the second discharge line, a normally-closed valve in the second discharge line, and means for opening the last-named valve when the throttle valves are closed.

6. A fuel system for a gas turbine engine or the like comprising, in combination, two pumps connected hydraulically in parallel, a common drive for the pumps, a first fuel connection adapted to extend from the pumps to the engine, throttling means in the said connection, a starting fuel connection adapted to extend from the pumps to the engine, a normally-closed shutoff valve in the starting fuel connection, means coupled to the throttling means for opening the shutoff valve when the throttling means is closed, and means coupled to the throttling means for normally disabling one of the pumps when the throttling means is opened.

7. A fuel system for a gas turbine engine or the like comprising, in combination, two pumps connected hydraulically in parallel, a common drive for the pumps, a first fuel connection adapted to extend from the pumps to the engine, throttling means in the said connection, a starting fuel connection adapted to extend from the pumps to the engine, a normally-closed shutoff valve in the starting fuel connection, means coupled to the throttling means for opening the shutoff valve when the throttling means is closed, means coupled to the throttling means for normally disabling one of the pumps when the throttling means is opened, and means responsive to pressure in the normal fuel connection for maintaining the said one of the pumps operative when the pressure is below a predetermined value.

8. A fuel supply system for an engine or the like, comprising, in combination, a normally operative main fuel pump, a normally inoperative auxiliary fuel pump, the said pumps being connected in parallel, a common discharge line for the pumps, means including backflow prevention means for connecting the pumps to the discharge line, throttling means for controlling flow through the discharge line, means to disable the main pump, means to activate the auxiliary pump, means responsive to reduction in pressure below a predetermined value in the outlet of the main pump for actuating the said disabling and activating means, and additional means for actuating the said activating means to render both pumps simultaneously operative to provide increased pumping capacity.

9. A fuel supply system comprising, in combination, parallel first and second flow paths, the first flow path comprising a first pump, a first by-pass from the first pump outlet to the first pump inlet, a first externally-controlled shutoff valve in the first by-pass, a first throttling valve, and means to prevent reverse flow into the outlet of the first path; the second flow path comprising a second pump, a second by-pass from the second pump outlet to the second pump inlet, a second externally-controlled shutoff valve in the second by-pass, a second throttling valve, and means to prevent reverse flow into the outlet of the second path; means responsive to pressure in the first path downstream from the first throttling valve for opening the first shutoff valve and closing the second shutoff valve upon decrease in pressure in the first path below a predetermined value; and a common outlet conduit connected to the outlets of both paths.

10. A fuel supply system comprising, in combination, parallel first and second flow paths, the first flow path comprising a first pump, a first by-pass from the first pump outlet to the first pump inlet, a first externally-controlled shutoff valve in the first by-pass, and means to prevent reverse flow into the outlet of the first path; the second flow path comprising a second pump, a second by-pass from the second pump outlet to the second pump inlet, a second externally-controlled shutoff valve in the second by-pass, and means to prevent reverse flow into the outlet of the second path; means responsive to pressure in the first path downstream from the first pump for opening the first shutoff valve and closing the second shutoff valve upon decrease in pressure in the first path below a predetermined value; a first common outlet conduit connected to the outlets of both paths; a second common outlet conduit connected to both paths downstream from the pumps therein; means to prevent reverse flow from the second outlet conduit into each path; a normally closed cutoff valve in the second outlet conduit; and means concurrently to maintain both shutoff valves closed and the cutoff valve open to direct the output of both pumps in parallel through the second outlet conduit.

11. A fuel supply system comprising, in combination, parallel first and second flow paths, the first flow path comprising a first pump, a first by-pass from the first pump outlet to the first pump inlet, a first externally-controlled shutoff valve in the first by-pass, a first throttling valve, and means to prevent reverse flow into the outlet of the first path; the second flow path comprising a second pump, a second by-pass from the second pump outlet to the second pump inlet, a second externally-controlled shutoff valve in the second by-pass, a second throttling valve, and means to prevent reverse flow into the outlet of the second path; means responsive to pressure in the first path downstream from the first throttling valve for opening the first shutoff valve and closing the second shutoff valve upon decrease in pressure in the first path flow a predetermined value; a first common outlet conduit connected to the outlets of both paths; a common second outlet conduit connected to both paths in advance of the said throttling valves therein; means to prevent reverse flow from the second outlet conduit into each path; and means actuated by closing the throttle valves to maintain both shutoff valves closed to direct the output of both pumps in parallel into the second outlet conduit.

12. In a fluid system, a first line through which fluid pressure may be transmitted from one point to another, a pump for applying pressure to the fluid in the line, means for unloading the pump, a control for regulating the movement of fluid in the line, a second line through which fluid pressure may be transmitted from the said one point to the said other point, a second pump for applying pressure to the fluid in the second specified line, a second control for regulating the movement of fluid in the second specified line, first control means connected to the said unloading means normally maintaining the first line operative and actuatable to operate the unloading means and thereby disable the first line, second control means normally maintaining the second line inoperative and actuatable to activate the second line, and means responsive to pressure in the first line connected to the two said control means actuating the two said control means concurrently to reverse positions in response to a drop in pressure in the first line below a predetermined value to thereby change the first pump from loaded to unloaded condition and the second line from inoperative to operative condition.

References Cited in the file of this patent

UNITED STATES PATENTS

| | | | |
|---|---|---|---|
| 312,158 | Peeney | Feb. 10, | 1885 |
| 1,408,611 | Larner | Mar. 7, | 1922 |
| 2,041,863 | Rhodes | May 26, | 1936 |
| 2,095,243 | Diescher | Oct. 12, | 1937 |
| 2,231,500 | Harlow | Feb. 11, | 1941 |
| 2,420,052 | Muir | May 6, | 1947 |
| 2,464,802 | Gavin et al. | Mar. 22, | 1949 |
| 2,614,617 | Bobier | Oct. 21, | 1952 |
| 2,665,637 | Fauck | Jan. 12, | 1954 |
| 2,686,561 | Isrelli et al. | Aug. 17, | 1954 |

FOREIGN PATENTS

| | | | |
|---|---|---|---|
| 918,123 | France | Oct. 7, | 1946 |